S. Staples,
Planking Clamp.
N°14,522. Patented Mar. 25, 1856.
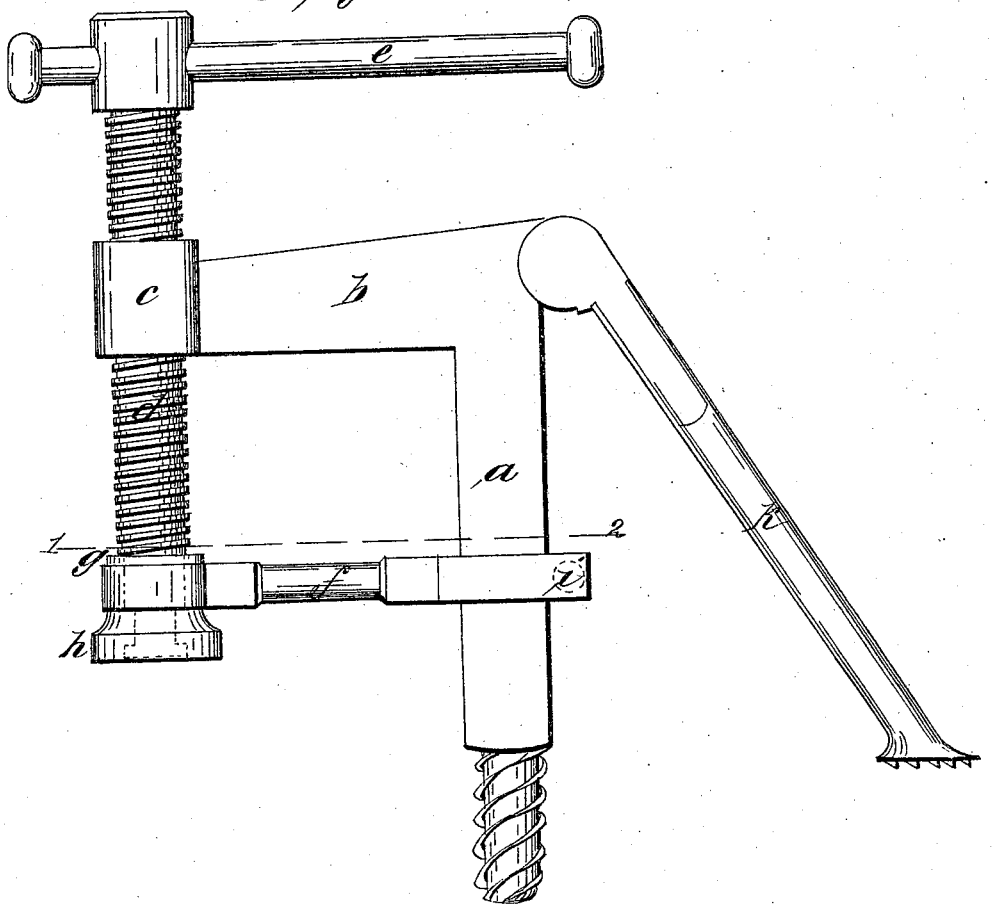

UNITED STATES PATENT OFFICE.

SOLON STAPLES, OF BATH, MAINE.

CLAMP FOR PLANKING SHIPS.

Specification of Letters Patent No. 14,522, dated March 25, 1856.

*To all whom it may concern:*

Be it known that I, SOLON STAPLES, of Bath, in the county of Sagadahoc and State of Maine, have invented certain new and useful Improvements in Self-Holding Planking-Screws; and I hereby declare that the following is a full, clear, and exact description of the same, reference being had to the accompanying drawings, making part of this specification, in which—

Figure 1 is an elevation of a planking screw, and Fig. 2 a transverse section in the line 1—2.

The letters of reference indicate the same parts in the different figures.

I construct my improvements as follows— A long iron shank $a$, is bent at a right angle at its upper end, forming an arm ($b$,) which carries a nut ($c$,) through which a screw ($d$) works when operated by means of a lever ($e$). The lower end of the shank is formed into a screw. The shank serves as a guide to the tie $f$, through one end of which it passes, while the other end is sustained by the screw $d$, a continuation of which passes through a hole therein, in which it revolves. The tie is held in position by the collar $g$, and swiveling foot piece $h$, and is moved freely by the screw up or down the shaft, aided by the friction roller $i$. At the upper end of the shank $a$, a brace ($k$) is jointed, its foot or lower extremity is provided with notches or holding teeth to prevent slipping.

The principal object of the above described combination, and arrangement of parts is to facilitate the operation of bending, and bringing to their proper position the inner or outer planks of vessels, and holding them there, until properly secured, but its use is not necessarily confined to ship building, as it will be found useful in many other operations where lumber is employed.

When my improvement is employed in planking vessels it may be used as follows— viz: The shank $a$, is screwed into a timber above or below the plank which is to be spiked to the vessel at the usual distance from the plank at which set bolts are placed. The arm $b$, is turned out of the way to allow the plank after its end is spiked, to be sufficiently bent to come within the range of the screw $d$, after the arm shall have been moved to a proper position to act upon the plank. The brace $k$ is then to be forced against the side of the vessel; its object is to counteract the strain upon the shank $a$, caused by the operation of the screw $d$, and to prevent the shank from being bent or broken thereby. The screw $d$ is then used to force the plank down to the timber, and wedges are introduced between the shank $a$, (which now serves as a set bolt) and the edge of the plank for the purpose of bringing it up against the edge of the adjoining plank. As the screw descends it brings with it the tie $f$, which sliding freely upon the shank $a$, preserves its perpendicular relation thereto, whatever may be the thickness of the plank and consequently holds the screw $d$, parallel to the shank $a$, resisting the tendency of the wedges to force the lower end of the screw from the shank and also by its rigidity preventing the approach of the screw toward the shank from any cause which might otherwise bend or break it.

A modification of the machine may be used in which another arm is extended at right angles to the shank, opposite to the arm $b$, and furnished with a similar screw, which when operated in opposition to the screw $d$ will perform the same function as the brace $k$, but I prefer the inclined brace as before described.

I do not claim the above described parts separately considered.

What I claim as my invention, and desire to secure by letters patent is—

The combination of the shank $a$, arm $b$, screw $d$, and brace $k$, with the rigid sliding tie $f$, constructed and arranged substantially as herein described, for the purpose specified.

In testimony whereof I have signed my name to this specification before two subscribing witnesses.

SOLON STAPLES

Witnesses:
CHAS. EVERETT,
A. POLLAK.